United States Patent
Sigamani et al.

(10) Patent No.: US 9,240,724 B2
(45) Date of Patent: Jan. 19, 2016

(54) MULTIPHASE DC/DC CONVERTERS AND CONTROL CIRCUITS FOR CONTROLLING CONVERTERS USING FIXED AND/OR VARIABLE FREQUENCIES

(71) Applicant: ASTEC INTERNATIONAL LIMITED, Kowloon (HK)

(72) Inventors: James Sigamani, Pasig (PH); Vijay Gangadhar Phadke, Pasig (PH)

(73) Assignee: ASTEC INTERNATIONAL LIMITED, Kowloon (HK)

( * ) Notice: Subject to any disclaimer, the term of this patent is extended or adjusted under 35 U.S.C. 154(b) by 0 days.

(21) Appl. No.: 13/800,143

(22) Filed: Mar. 13, 2013

(65) Prior Publication Data
US 2014/0268891 A1    Sep. 18, 2014

(51) Int. Cl.
*H02M 3/28*    (2006.01)
*H02M 3/158*    (2006.01)
*H02M 3/335*    (2006.01)

(52) U.S. Cl.
CPC ............ *H02M 3/285* (2013.01); *H02M 3/1584* (2013.01); *H02M 3/33507* (2013.01)

(58) Field of Classification Search
CPC .................. H02M 2007/4815; H02M 3/33507; H02M 3/1584; H02M 3/285; H02M 3/33561
USPC ........ 363/15, 16, 17, 21.01, 21.02, 21.03, 65; 323/234, 237, 265, 269
See application file for complete search history.

(56) References Cited

U.S. PATENT DOCUMENTS

| | | | |
|---|---|---|---|
| 6,970,366 B2 | 11/2005 | Apeland et al. | |
| 7,596,007 B2 | 9/2009 | Phadke et al. | |
| 2007/0086224 A1* | 4/2007 | Phadke et al. | 363/65 |
| 2010/0033154 A1* | 2/2010 | Cheng et al. | 323/293 |
| 2010/0225280 A1* | 9/2010 | Vogel | 320/145 |
| 2011/0057632 A1* | 3/2011 | Cheng et al. | 323/234 |
| 2011/0069514 A1* | 3/2011 | Chiba | 363/21.02 |
| 2012/0014148 A1* | 1/2012 | Li et al. | 363/78 |
| 2013/0194832 A1* | 8/2013 | Han et al. | 363/21.02 |

* cited by examiner

*Primary Examiner* — Jeffrey Gblende
(74) *Attorney, Agent, or Firm* — Harness, Dickey & Pierce, P.L.C.

(57) ABSTRACT

A multiphase DC/DC power converter includes an input, an output, at least a first converter and a second converter coupled in parallel between the input and the output, an inductor coupled to the first and second converters, an output capacitor coupled between the first and second converters and the output, and a control circuit coupled to the first converter and the second converter. The first and second converters each include a power switch. The control circuit is configured to switch the power switches at a frequency with a phase shift therebetween, and to vary the frequency to regulate a voltage at the output. Additionally, the control circuit may be configured to switch power switches at a fixed frequency with substantially no phase shift therebetween during startup of a multiphase DC/DC power converter, and at a variable frequency with a defined phase shift therebetween after startup.

7 Claims, 4 Drawing Sheets

MULTIPHASE DC/DC CONVERTERS AND CONTROL CIRCUITS FOR CONTROLLING CONVERTERS USING FIXED AND/OR VARIABLE FREQUENCIES

FIELD

The present disclosure relates to multiphase DC/DC converters.

BACKGROUND

This section provides background information related to the present disclosure which is not necessarily prior art.

A multiphase DC/DC converter includes multiple converters connected in parallel and operated at the same frequency with a phase shift therebetween. The converters may be independent resonant converters that produce overlapping currents at the output of the multiphase DC/DC converter. These overlapping currents may assist in reducing ripple current in the output capacitor. Additionally, the multiphase DC/DC converter may include an inductor coupled to the converters to promote current sharing between the converters. This also assists in reducing ripple current in the output capacitor.

SUMMARY

This section provides a general summary of the disclosure, and is not a comprehensive disclosure of its full scope or all of its features.

According to one aspect of the present disclosure, a multiphase DC/DC power converter includes an input, an output, at least a first converter and a second converter coupled in parallel between the input and the output, an inductor coupled to the first and second converters, an output capacitor coupled between the output and a reference potential, and a control circuit coupled to the first converter and the second converter. The first and second converters each include a power switch. The control circuit is configured to switch the power switches at a frequency with a phase shift therebetween, and to vary the frequency to regulate a voltage at the output.

According to another aspect of the present disclosure, a multiphase DC/DC power converter includes an input, an output, at least a first converter and a second converter coupled in parallel between the input and the output, an inductor coupled to the first and second converters, an output capacitor coupled between the output and a reference potential, and a control circuit coupled to the first converter and the second converter. The first and second converters each include a power switch. The control circuit is configured to switch the power switches at a fixed frequency with substantially no phase shift therebetween during startup of the multiphase DC/DC power converter, and to switch the power switches at a variable frequency with a defined phase shift therebetween after startup of the multiphase DC/DC power converter.

According to another aspect of the present disclosure, a control circuit for a multiphase DC/DC power converter is disclosed. The multiphase DC/DC power converter has an input, an output, at least a first converter and a second converter coupled in parallel between the input and the output, an inductor coupled to the first and second converters, and an output capacitor coupled between the output and a reference potential. The first and second converters each including a power switch. The control circuit is configured to switch the power switches at a fixed frequency with substantially no phase shift therebetween during startup of the multiphase DC/DC power converter, and to switch the power switches at a variable frequency with a defined phase shift therebetween after startup of the multiphase DC/DC power converter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
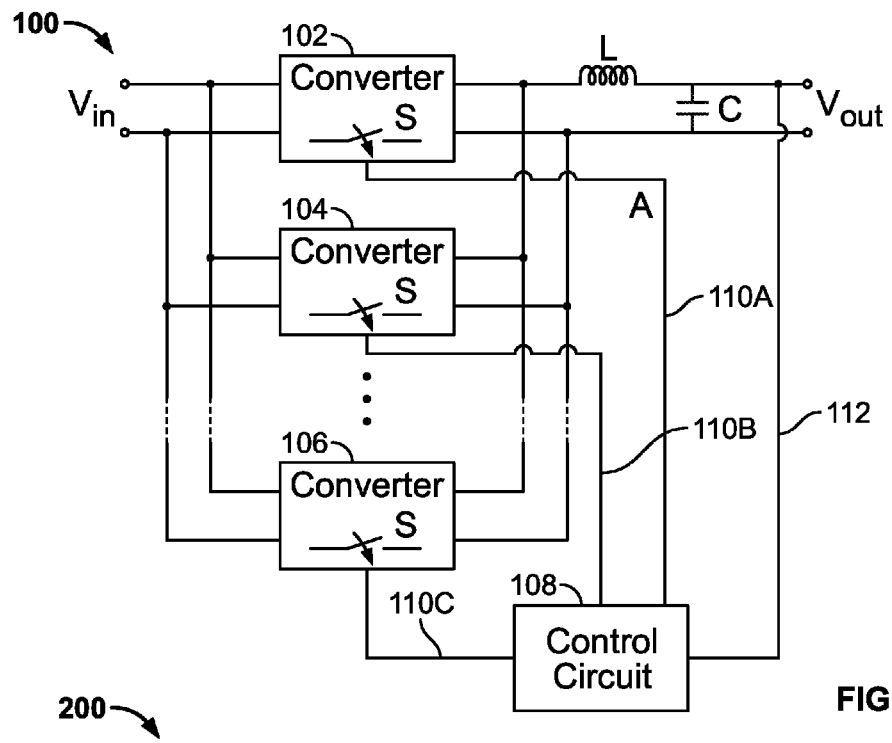
FIG. 1 is a block diagram of a multiphase DC/DC power converter including three converters and a control circuit according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A multiphase DC/DC power converter according to one example embodiment of the present disclosure is illustrated in FIG. 1 and indicated generally by reference number 100. As shown in FIG. 1, the multiphase DC/DC power converter 100 includes an input Vin, an output Vout, multiple converters 102, 104, 106 coupled in parallel between the input Vin and the output Vout, an inductor L, an output capacitor C, and a control circuit 108 coupled to each converter 102, 104, 106. Each converter includes a power switch S.

As further explained below, the control circuit 108 switches the power switches S at a frequency with a phase shift therebetween. Additionally, the control circuit 108 varies the frequency to regulate a voltage at the output Vout.

Additionally, the control circuit 108 may switch the power switches S at a fixed frequency with substantially no phase shift therebetween during startup of the multiphase DC/DC power converter 100. The control circuit 108 then switches the power switches S at a variable frequency with the phase shift therebetween after startup of the multiphase DC/DC power converter 100.

As shown in FIG. 1, the inductor L is coupled between the output capacitor C and the converters 102, 104, 106. Alternatively, the inductor L may be coupled on an input side of the converters 102, 104, 106. For example, in some embodiments, the inductor L may be coupled between the input Vin and the converters 102, 104, 106. As apparent to those skilled in the art, the value of inductor L may be different depending on, for example, the location of the inductor L, other resonant elements within the power converter 100, etc.

As further explained below, providing the inductor L in the multiphase DC/DC power converter 100 (e.g., coupled between the converters 102, 104, 106 and the output capacitor C) may reduce the ripple current in the output capacitor C, balance the currents in the multiple converters 102, 104, 106, and/or facilitate lossless switching transitions. This may improve efficiency of the multiphase DC/DC converter 100.

In the example of FIG. 1, the output capacitor C is coupled between the output and a reference potential. The reference potential may include a reference voltage such as earth ground, chassis ground, etc. or another suitable reference potential. As shown in FIG. 1, the output capacitor is coupled to the inductor L to form an LC filter. In particular, the output capacitor C is coupled on the output side of the inductor L so that the output capacitor C is isolated from the converters 102, 104, 106 by the inductor L. Alternatively, if the inductor L is coupled on an input side of the converters 102, 104, 106, the output capacitor C may be coupled to an output of each converter 102, 104, 106. Further, although one output capacitor C is shown, any suitable number of capacitors may be employed.

As shown in FIG. 1, the converters 102, 104, 106 are coupled in parallel between the input Vin and the output Vout. Additionally, each converter 102, 104, 106 may include a rectification circuit (not shown in FIG. 1) coupled to the power switch S. The rectification circuit may include, for example, a center tapped full wave rectifier, a bridge rectifier, or any other suitable rectification circuit for producing DC power from AC power.

Additionally, the phase shift between converters 102, 104, 106 may be varied to control the overlap of rectified pulses depending upon the number of converters employed. For example, the phase shift may be equal to 360/(2*N), where N is the number of converters in the multiphase DC/DC power converter 100.

As shown in FIG. 1, the control circuit 108 provides a control signal 110A, 110B, 110C to the converters 102, 104, 106, respectively. The control circuit 108 switches (via the control signal 110A, 110B, 110C) the power switches S at a variable frequency to regulate a voltage at the output Vout. In this way, a pre-regulator circuit is not needed to regulate the voltage at the output Vout. Accordingly, as shown in FIG. 1, the input Vin is not coupled to a pre-regulator circuit for regulating the voltage at the output Vout.

Additionally, in the example of FIG. 1, the control circuit 108 receives a signal 112 representing the voltage at the output Vout of the multiphase DC/DC power converter 100. In this way, the control circuit 108 may provide closed loop control for regulating the output voltage of the multiphase DC/DC power converter 100. Additionally and/or alternatively, although not shown in FIG. 1, the control circuit 108 may receive other signals representing parameters of the multiphase DC/DC power converter 100 including, for example, a voltage at the input Vin.

As shown in the example of FIG. 1, the output of each converter 102, 104, 106 are shorted together on the input side of the inductor L. Such interconnection with the appropriate phase shift as mentioned above results in overlapping outputs. The overlapping outputs as well as the inductor L and/or the presence of resonant elements in each converter 102, 104, 106 may help force current from each converter 102, 104, 106 to increase or decrease in a resonant fashion. In this way, a resonant condition of one converter may be forced by the other converters. Thus, the rate of which current from one or more converters increases or decreases is substantially the same as the rate of which current in the other converter(s) decreases or increases. Therefore, the current through the inductor L (i.e., the sum of current provided by each converter 102, 104, 106) is substantially constant.

Additionally, as explained above, the converters 102, 104, 106 operate simultaneously as resonant converters. However, if one or more of the converters is disabled, the other converter(s) will not operate as a resonant converter(s). This is due to the inductor L coupled to the converters 102, 104, 106 as explained above. In such a condition, the control circuit 108 would provide the active converter(s) a pulse width modulated signal at a fixed frequency to achieve voltage regulation at the output Vout.

As explained above, this feature of controlling converters 102, 104, 106 with a pulse width modulated signal at a fixed frequency may be employed to control the power converter 100 during other conditions as well. For example, the control circuit 108 switches the power switches S at the fixed frequency (with substantially no phase shift) during startup of the multiphase DC/DC power converter 100. Therefore, to regulate the voltage at the output Vout, duty cycles of the power switch(es) S of each converter 102, 104, 106 may be varied.

By employing a fixed frequency during startup, the power converter 100 may be soft started to reduce current stress on the power switches S. For example, during startup of the power converter 100, the output capacitor C may be discharged. By switching the power switches S at a fixed frequency, a closed loop, monotonic rise in the charge of the output capacitor C may be achieved. In this way, the power converter 100 is soft started.

Then, at some point in time after startup of the power converter 100, the control circuit 108 may switch the power switches S at a variable frequency with a defined phase shift therebetween after the voltage at the output Vout is substantially regulated. In some embodiments, this transition may include increasing a phase shift between the power switches S from the substantially no phase shift (as explained above) to the defined phase shift over a defined time period. The defined time period may be any suitable time, including, for example, one switching cycle of the power converter 100, etc. Alternatively, this transition may include several incrementing phase shifts of some of the converters until the defined phase shift is achieved.

In the example of FIG. 1, the multiphase DC/DC power converter 100 include three converters 102, 104, 106. However, it should be understood that two or more converters may be employed in any given application of this disclosure. For example, additional converters may be added to a particular implementation to achieve higher efficiencies and/or for increased output power. Regardless of the number, the multiple converters preferably employ the same topology. For example, the multiple converters may be forward converters, bridge converters (including full bridge converters, half bridge converters as shown in FIG. 2, etc.), push-pull converters, etc.

Figure 2:
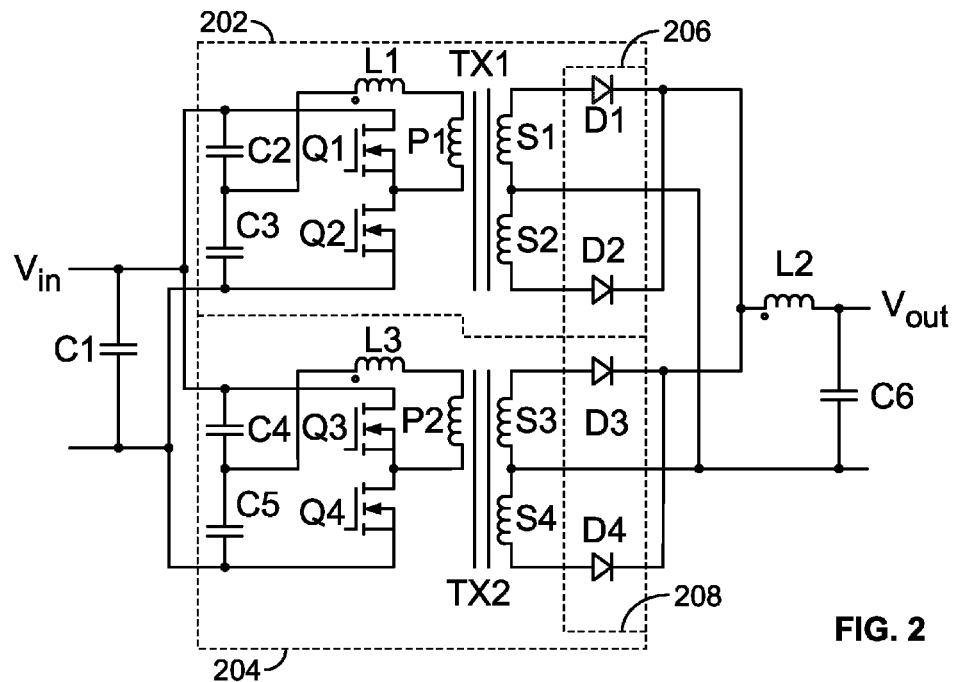
FIG. 2 is a schematic of a multiphase DC/DC power converter including two half bridge converters according to another example embodiment.

FIG. 2 is one example of a multiphase DC/DC power converter 200 including an input Vin, two converters 202, 204, an inductor L2, an output capacitor C6 and an output Vout. The converters 202 and 204 are coupled in parallel between the input Vin and the inductor L2. Further, the output capacitor C6 is coupled between the inductor L2 and the output Vout.

As shown in FIG. 2, the power converter 200 may include a filter coupled to the input Vin. In the example of FIG. 2, the filter is a capacitor C1. Alternatively, the filter may include different and/or additional filtering elements if desired.

In the example embodiment of FIG. 2, the converters 202, 204 employ the same topology. Each is a half bridge converter having its own isolation transformer TX1, TX2 coupled to a rectification circuit 206, 208. Each rectification circuit 206, 208 is coupled to the inductor L2.

As shown in FIG. 2, the rectification circuits 206 and 208 are center tapped full wave rectifiers and include diodes D1, D2 and D3, D4, respectively. Although the example of FIG. 2 illustrates the rectification circuits 206, 208 as including diode rectifiers, synchronous rectifier FETs (e.g., MOSFETs) may be used to further improve efficiency.

Additionally, the converter 202 includes power switches Q1, Q2 coupled to a primary winding P1 of transformer TX1. Secondary windings S1, S2 of transformer TX1 are coupled to the output Vout via the rectification circuit 206. The converter 204 includes power switches Q3, Q4 coupled to a primary winding P2 of transformer TX2. Secondary windings S3, S4 of transformer TX2 are coupled to the output Vout via the rectification circuit 208.

In addition to the transformers TX1, TX2, the converter 202 may employ additional resonant elements coupled to the primary windings P1, P2. In the example of FIG. 2, the converter 202 includes capacitors C2, C3 coupled to power switches Q1, Q2, respectively, and an inductor L1 coupled between the capacitors C2, C3 and the primary winding P1 of transformer TX1. Likewise, the converter 204 includes capacitors C4, C5 coupled to power switches Q3, Q4, respectively, and an inductor L3 coupled between the capacitors C4, C5 and the primary winding P2 of transformer TX2.

For clarity, inductors L1, L3 are shown as separate external inductors from the transformers TX1, TX2. However, it should be apparent that the inductors L1, L3 may include separate external inductances (e.g., from an inductor) as well as leakage and/or parasitic inductances from the transformers TX1, TX2.

The resonant elements may be any suitable value depending on design and desired results. For example, values of corresponding resonant elements may be chosen to be substantially equal.

Figure 6:
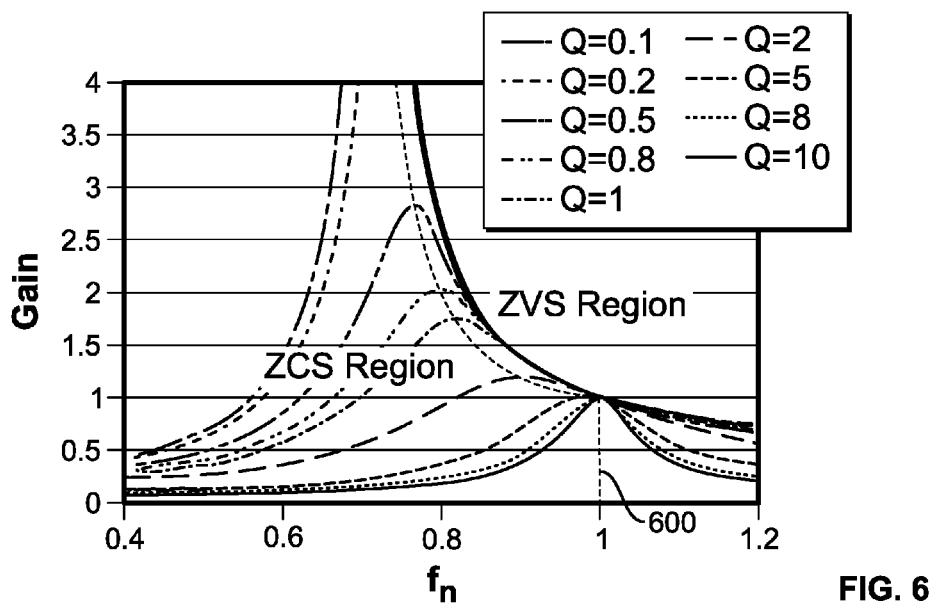
FIG. 6 is a graph illustrating an example of a zero current switching region and a zero voltage switching region for one of the half bridge converters of FIG. 2.

Depending on the design, the power switches Q1, Q2, Q3, Q4 may be capable of soft switching. For example, values of the capacitors C2, C3, C4, C5, the inductors L1, L3 and the magnetizing inductance of each transformer TX1, TX2 may be selected to achieve substantially zero voltage and/or current switching of the power switches Q1, Q2, Q3, Q4. In this way, soft switching of the power switches Q1, Q2, Q3, Q4 may be capable while varying the frequency if the frequency variation is below a resonant frequency. However, if the frequency variation is above the resonant frequency, zero current switching of the power switches Q1, Q2, Q3, Q4 may be compromised. FIG. 6 illustrates an example of a zero current switching region and a zero voltage switching region for one of the converters 202, 204. A resonant frequency is shown by the dashed line 600.

Figure 3:
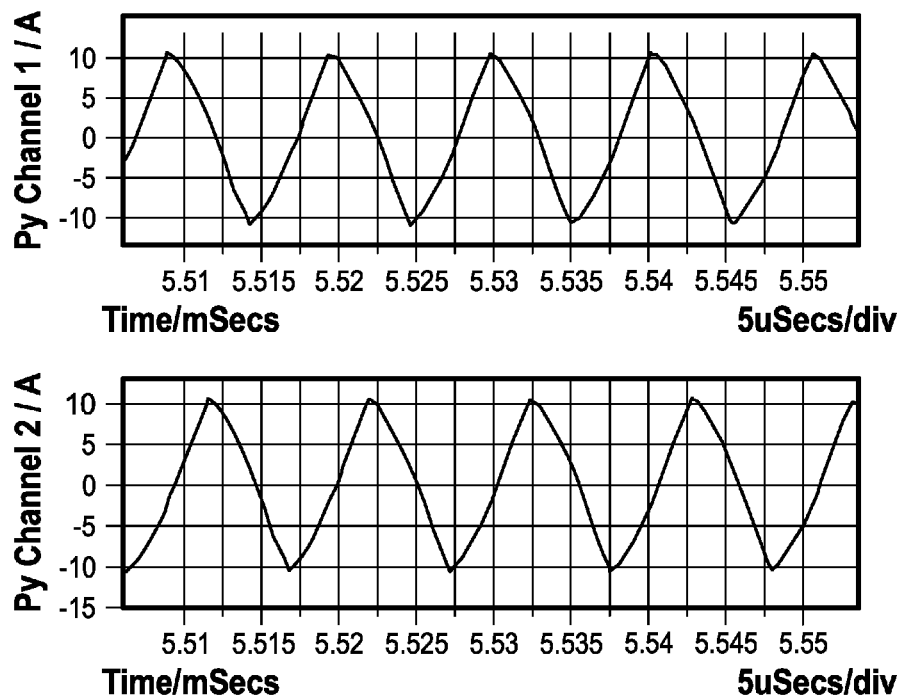
FIG. 3 is a graph illustrating triangular shaped waveforms of current in the two half bridge converters of FIG. 2.

Referring back to FIG. 2, despite possible inequalities (e.g., from tolerance related variations, etc.) in the resonant elements, the inductor L2 may assist in achieving current balance in the converters 202, 204. In this way, the inductor L2 may stabilize a load current flowing to the output Vout in steady state conditions. To stabilize the load current, the sum of the current from each converter 202, 204 remains substantially constant (as described above). Therefore, when current from the converter 202 to the inductor L2 is ramping up, current from the converter 204 is ramping down at the same rate (and vice versa) to maintain the substantially constant load current through the inductor L2. This relationship between current from each converter 202, 204 results in a current waveform having a substantially triangular shape in the primary and secondary windings of each transformer TX1, TX2. For example, FIG. 3 illustrates triangular shaped waveforms of current in the primary winding of each transformer TX1, TX2.

Referring again to FIG. 2, as a result of the current relationship from the converters 202, 204, ripple current in the output capacitor C6 may be reduced and in some cases, substantially zero. In some embodiments, the ripple may be about 2% rms of the output load current. Likewise, this same result may be realized by the capacitor C1 coupled between the input Vin and the converters 202, 204. It should be understood, however, that the ripple current may vary depending on the values of the resonant elements of the converters 202, 204.

Figure 4:
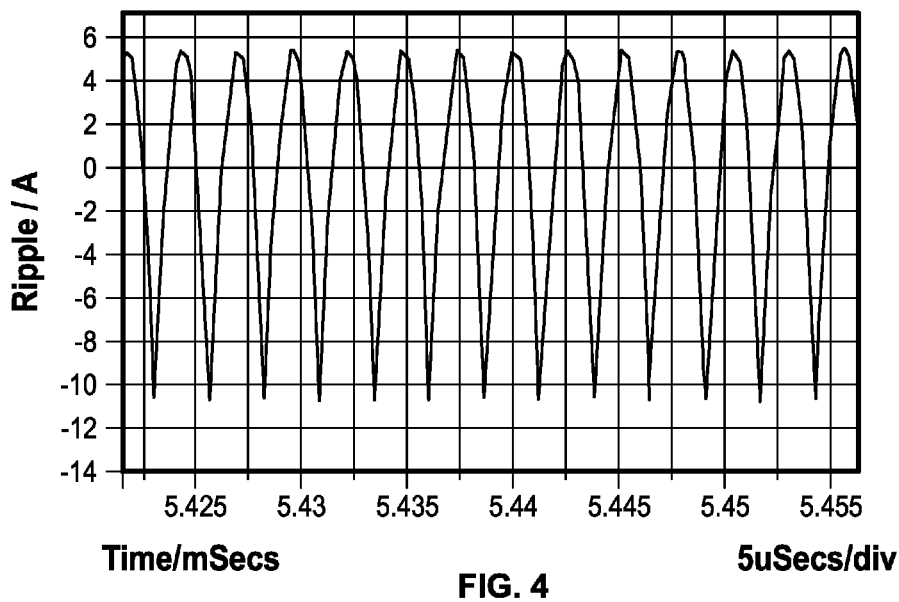
FIG. 4 is a graph illustrating a waveform of ripple current in an output capacitor of the power converter of FIG. 2.

FIG. 4 illustrates an example waveform of ripple current in the output capacitor C6 for a 12V/180 A rated power rail. As shown in FIG. 4, the ripple current is about 4.7 A rms.

Although not shown in FIG. 2, the power switches Q1, Q2, Q3, Q4 are switched by a control circuit (e.g., similar to the control circuit 108 of FIG. 1). For example, the control circuit may switch the power switches Q1, Q2, Q3, Q4 at a variable frequency to regulate the voltage at the output Vout. Therefore, and as shown in FIG. 2, the input Vin of the power converter 200 is not coupled to a pre-regulator circuit to regulate the voltage at the output Vout.

Additionally and/or alternatively, the control circuit may switch the power switches Q1, Q2, Q3, Q4 at a fixed frequency with substantially no phase shift therebetween during startup of the multiphase DC/DC power converter 200. Then, at some point in time after startup, the control circuit may switch the power switches Q1, Q2, Q3, Q4 at a variable frequency with a defined phase shift therebetween.

To regulate the output voltage while having a variable frequency, a relationship is formed between the values of the resonant elements (e.g., the capacitors C2, C3, C4, C5, the inductors L1, L3, etc.) of each converter 202, 204 and the value of the magnetizing inductance of the transformers TX1, TX2. For example, the values of the resonant elements and the magnetizing inductances of the transformers TX1, TX2 may be selected based on the design requirements including, for example, maximum efficiency required (e.g., at 50% load, 100% load, etc.), increased hold-up capacity, soft switching (explained above), etc.

Figure 7:
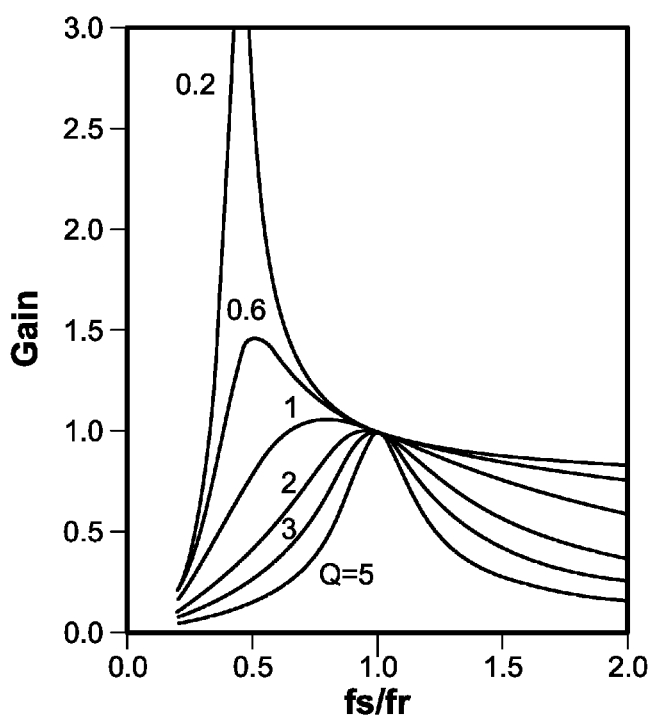
FIG. 7 is a graph illustrating example DC characteristics of one of the half bridge converters of FIG. 2.

Additionally, by employing a variable frequency, the power converter 200 may operate at a gain of one. Alternatively, if desired, the power converter 200 may be operated at a gain of less or more than one. For example, the gain and the frequency depend on a load coupled to the output Vout and the voltage at the input Vin. In this way, one skilled in the art can design the converters 202, 204 to achieve a desired gain. For example, FIG. 7 illustrates example gain curves for one of the converters 202, 204.

In addition, and as explained above, the converters 202, 204 are operated simultaneously as resonant converters. However, when one converter (e.g., converter 202) is disabled, the other active converter (e.g., converter 204) does not operate as a resonant converter due to the presence of the inductor L2. In such a condition, the control circuit (not shown) may provide the active converter a pulse width modulated signal at a fixed frequency to achieve voltage regulation at the output Vout. Additionally, current in the primary and secondary windings of the transformer in the active converter would have a substantially square wave (e.g., a trapezoidal, square, etc.) shape instead of the triangular shape as described above.

Figure 5:
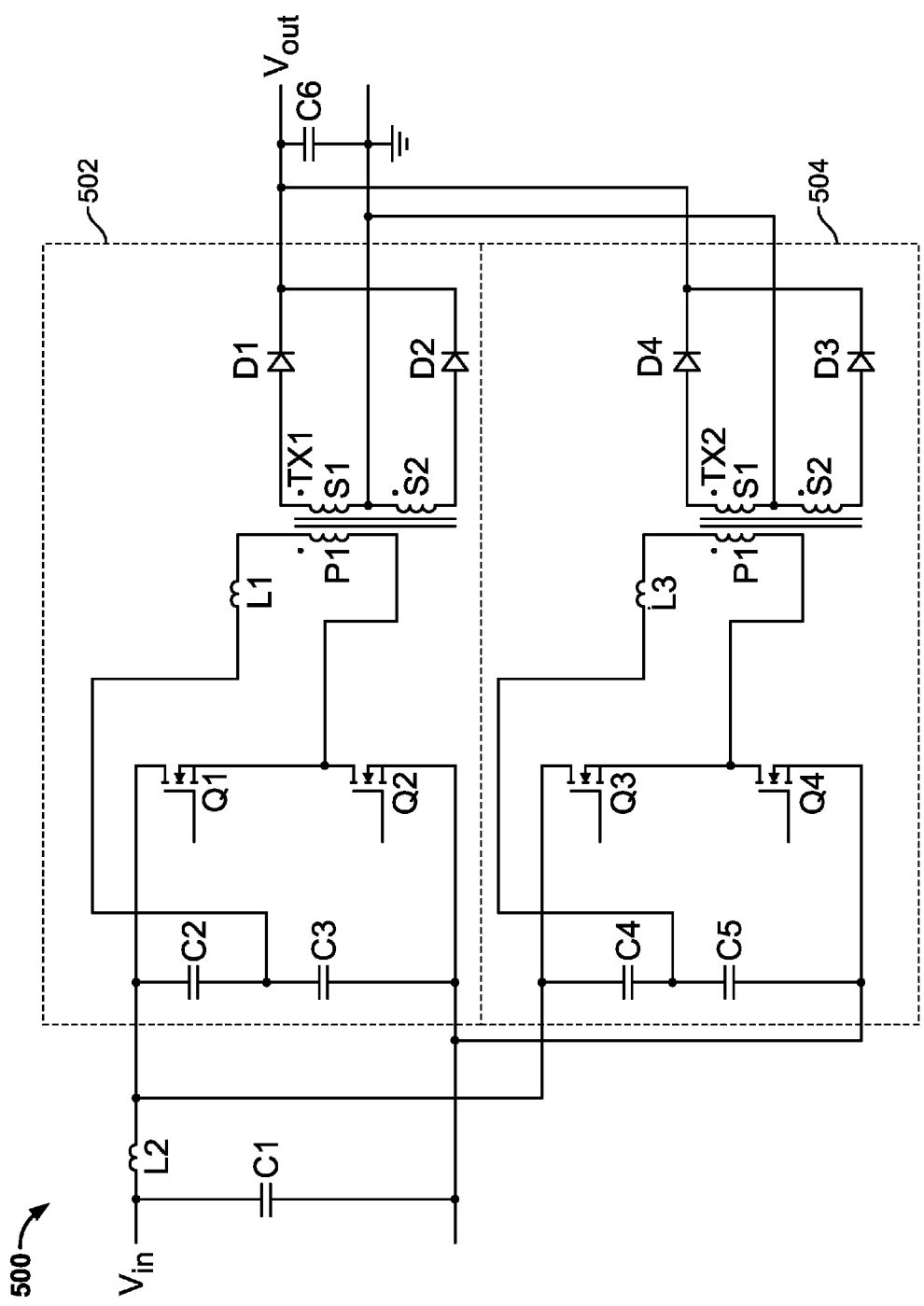
FIG. 5 is a schematic of a multiphase DC/DC power converter including two half bridge converters according to another example embodiment.

FIG. 5 illustrates an example multiphase DC/DC power converter 500 substantially similar to the multiphase DC/DC power converter 200 of FIG. 2. However, as shown in FIG. 5, the multiphase DC/DC power converter 500 includes converters 502, 504 and an inductor L2 coupled on an input side of the converters 502, 504. For example, in the example of FIG. 5, the inductor L2 is coupled between an input capacitor C1 and the converters 502, 504.

Additionally, by coupling the inductor L2 on the input side of the converters 502, 504, substantially the same benefits as described above with respect to FIGS. 1 and 2 (which include an inductor coupled on the output side of converters) may be obtained. For example, coupling the inductor L2 on the input side of the converters 502, 504 may reduce ripple current in the input capacitor C1.

The multiphase DC/DC power converters disclosed herein may include high performance converters having an output power of 3 kW or more. Additionally, although a half bridge converter is shown in the example of FIG. 2, any suitable converter topology may be employed including forward converters, other bridge converters (e.g., full bridge), push-pull converters, etc.

Additionally, the power switches disclosed herein may be any suitable power switch including, for example, Gallium Nitride (GaN) power switches that are switched at a frequency in the range of 500 kHz to 1 MHz.

Further, the teachings disclosed herein may be employed in many different power applications, including, for example, high power converters, server power supplies, etc.

By employing the teachings disclosed herein, power converters may have low electromagnetic interference (EMI), reduced ripple current stress for input and output capacitors, increased efficiency, lossless switching transitions, etc. Additionally, by employing the teachings disclosed herein, the converters may handle practical tolerance related variations in the resonant elements without degrading performance, achieve substantially monotonic rise of the output voltage during startup without high levels of stress on switching devices, include lower current stresses during short circuit conditions, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A multiphase DC/DC power converter comprising an input, an output, at least a first converter and a second converter coupled in parallel between the input and the output, an inductor coupled to the first and second converters, an output capacitor coupled between the output and a reference potential, and a control circuit coupled to the first converter and the second converter, the first and second converters each including a power switch, the control circuit configured to switch the power switches at a fixed frequency with substantially no phase shift therebetween during startup of the multiphase DC/DC power converter, and to switch the power switches at a variable frequency with a defined phase shift therebetween after startup of the multiphase DC/DC power converter to vary a gain of the multiphase DC/DC power converter and regulate a voltage at the output.

2. The multiphase DC/DC power converter of claim 1 wherein the inductor is coupled between the output capacitor and the first and second converters.

3. The multiphase DC/DC power converter of claim 2 wherein the defined phase shift is equal to $360/(2*N)$, where N is the number of converters.

4. The multiphase DC/DC power converter of claim 1 wherein the control circuit is configured to increase phase shift between the power switches from the substantially no phase shift to the defined phase shift over a defined time period.

5. The multiphase DC/DC power converter of claim 4 wherein the defined time period is one switching cycle.

6. The multiphase DC/DC power converter of claim 1 wherein the control circuit is configured to switch the power switches at the variable frequency after a voltage at the output is substantially regulated.

7. A control circuit for a multiphase DC/DC power converter having an input, an output, at least a first converter and a second converter coupled in parallel between the input and the output, an inductor coupled to the first and second converters, and an output capacitor coupled between the output and a reference potential, the first and second converters each including a power switch, the control circuit configured to switch the power switches at a fixed frequency with substantially no phase shift therebetween during startup of the multiphase DC/DC power converter, and to switch the power switches at a variable frequency with a defined phase shift therebetween after startup of the multiphase DC/DC power converter to vary a gain of the multiphase DC/DC power converter and regulate a voltage at the output.

* * * * *